United States Patent [19]

Maitre et al.

[11] Patent Number: 4,847,622

[45] Date of Patent: Jul. 11, 1989

[54] COHERENT PULSE RADARS

[75] Inventors: Bernard Maitre, Elancourt; Marie-Françoise Schaub, Noisy Le Roy, both of France

[73] Assignee: Electronique Serge Dassault, Saint Cloud, France

[21] Appl. No.: 161,036

[22] Filed: Feb. 26, 1988

[51] Int. Cl.⁴ ............................................. G01S 13/64
[52] U.S. Cl. .................................. 342/110; 342/111; 342/137
[58] Field of Search ............... 342/137, 192, 194, 196, 342/115, 107, 90, 110, 111

[56] References Cited

U.S. PATENT DOCUMENTS

| | | | |
|---|---|---|---|
| 3,631,489 | 12/1971 | Cooper | 343/7.7 |
| 3,778,604 | 12/1973 | Bosc et al. | 235/152 |
| 3,902,174 | 8/1975 | Siegel | 342/110 |
| 4,057,800 | 11/1977 | Ganz | 343/8 |
| 4,062,012 | 12/1977 | Colbert et al. | 342/90 |
| 4,114,152 | 9/1978 | Wiedemann et al. | 342/110 X |
| 4,119,966 | 10/1978 | Bouvier et al. | 342/90 |
| 4,454,511 | 6/1984 | Peters | 342/137 X |
| 4,642,641 | 2/1987 | Campbell | 342/137 X |
| 4,727,375 | 2/1988 | Lacomme | 342/137 X |
| 4,730,189 | 3/1988 | Siegel et al. | 342/194 |

FOREIGN PATENT DOCUMENTS 0059998 9/1982 European Pat. Off. .

OTHER PUBLICATIONS

Racine Concept for Radar: Principles and Experimental Model By H. Bosc and J. M. Colin Laboratoire Central de Telecommunications, Paris.

Primary Examiner—T. H. Tubbesing
Assistant Examiner—Mark Hellner
Attorney, Agent, or Firm—Nixon & Vanderhye

[57] ABSTRACT

A coherent pulse radar is activated successively according to at least two pulse repetition frequencies. These frequencies are of values such that (a) the received signal is ambiguous both with regard to distance and with regard to velocity, and (b) their ratio is reducible to the quotient of two integers which are preferably adjacent and have no common factors. For the frequency analysis, a number of samples is taken which depends upon the pulse repetition frequency, the numbers of samples associated with the two pulse repetition frequencies being, in relation to one another, in the ratio of the two integers. The distance/velocity resolution cell is then invariant with respect to the pulse repetition frequency; this permits removal of the ambiguity concerning mean information items appertaining to a long integration time.

15 Claims, 3 Drawing Sheets

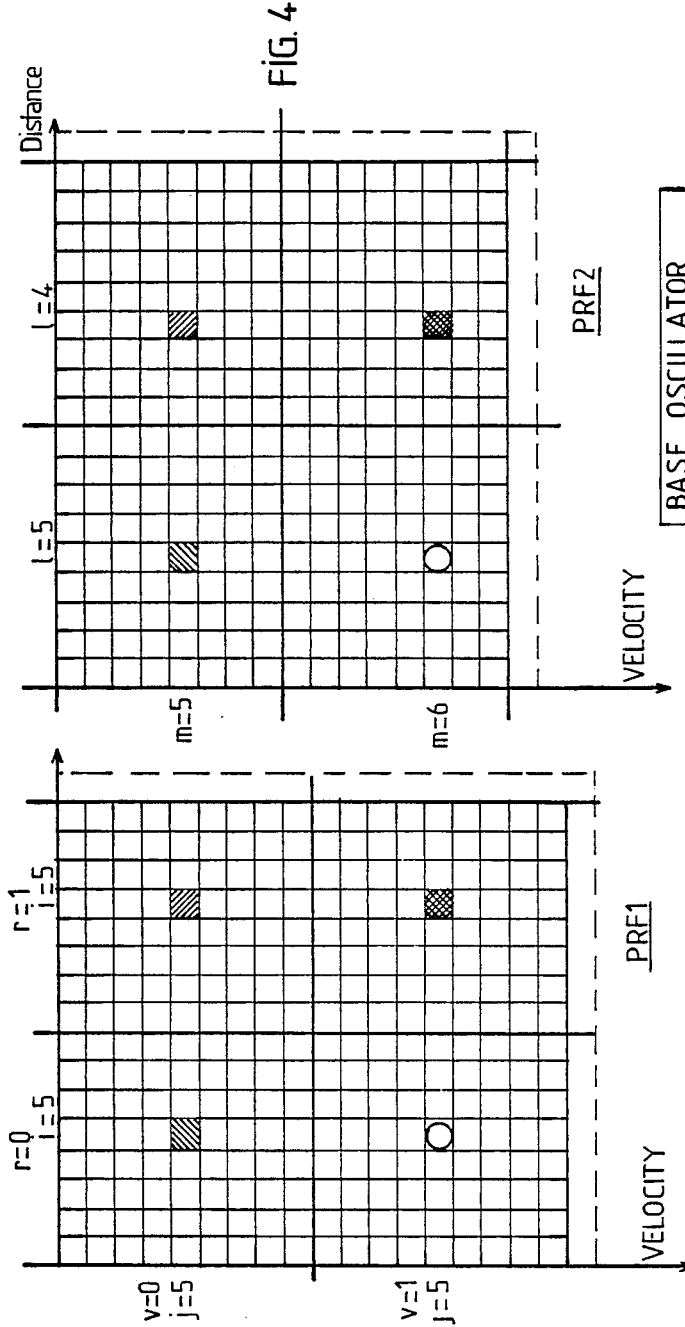
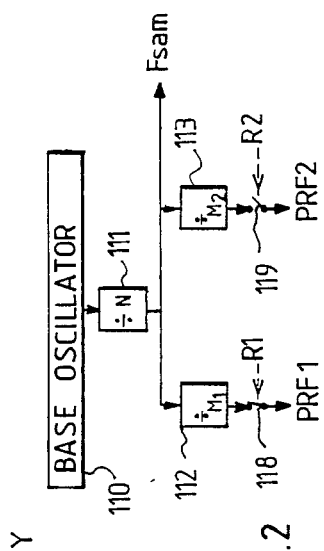
FIG. 2
FIG. 3
FIG. 4

COHERENT PULSE RADARS

FIELD OF THE INVENTION

The invention relates to coherent pulse radars.

PRIOR ART

In such radars, the microwave electromagnetic energy is emitted according to pulses which follow one another at a frequency referred to as the pulse repetition frequency. The signals received are subjected to a demodulation which is coherent in relation to the emitted microwave energy. The radar receives, in addition to the noise, electromagnetic energy originating from the reflection of the emitted signal at various obstacles some of which, such as the ground, are fixed and others, such as the targets, etc. are movable. It is essentially the movable targets which are of interest here.

The information which it is desired to obtain from the radar is not only the presence of a target, but also its identification, which comprises the determination of its distance in relation to the radar, and of its velocity relative to it. This determination is complicated by the phenomenon of ambiguity, which arises both with regard to the distance and with regard to the velocity, and is due to the periodic pulse repetition of the emitted pulses.

The distance ambiguity is greater the higher is the pulse repetition frequency so that, as regards the distance, the suppression or the reduction of ambiguity would involve selecting a relatively low pulse repetition frequency (low pulse repetition frequency or LPRF radars). Conversely, with regard to the velocity ambiguity, the unambiguous determination of the Doppler frequency shift is the easier the higher is the pulse repetition frequency (high pulse repetition frequency or HPRF radars). In LPRF or HPRF radars, unambiguous information is available either concerning distance or concerning velocity. It is then possible to control in an effective manner the level of false alarms, by means of a regulation system which is based on this unambiguous information in order to control an extractor. Moreover, these radars can be made fairly sensitive by forming therein a mean or integration of the received signal over a large number of pulse repetitions, before taking the "target recognised" decision. As far as possible, the procedure adopted is such that the time of integration of the received signal is equal to the time of illumination of the presumed target by the radioelectric beam.

When the value of the pulse repetition frequency is medium (MPRF), the available information concerning distance and concerning velocity is in both cases ambiguous. For such radars a process has already been proposed in which the radar is first of all caused to operate at a first pulse repetition frequency, detection taking place in a synchronous manner and the received signals being placed in store, and the ambiguity rank of each one of these signals is determined. In a second period of time, this first pulse repetition mode is caused to be followed by another mode, which differs therefrom by the selection of another pulse repetition frequency, and the respective positions of the detected signals using each of the modes are compared. The decision of the presence or of the absence of a target is then taken for each one of the pulse repetitions, which are thus considered independently of one another. As a result of this the radars utilizing this process are less sensitive than those which utilize only a single pulse repetition frequency, having regard to the long integration time permitted by the single pulse repetition frequency type.

OBJECTS OF THE INVENTION

It is an object of the present invention to provide a process and an apparatus which, while having recourse to at least two pulse repetition frequencies, maintain a sensitivity which is virtually equal to that of a prior art (LPRF or HPRF) radar, utilizing only one pulse repetition frequency.

It is a further object of the invention to provide an improved radar apparatus of the type using emission of recurrent pulses and coherent reception, with temporary recording in store of digital samples representing the complex signal resulting from the coherent reception, then time and frequency analysis of this complex signal based on said digital samples, in order to determine a quantity representing the energy received in each distance/velocity resolution cell, and finally extraction of true echoes, on each occasion by comparison of a quantity drawn from these quantities of energy with a threshold.

SUMMARY OF THE INvENTION

According to the invention, in each beam position, the radar emitter is activated successively according to two different pulse repetition frequencies, having values such that the received signal is ambiguous both with regard to distance and with regard to velocity and that their ratio can be reduced to the quotient of two mutually prime integers (i.e. integers which have no common factors); the time-analysis and frequency-analysis device operates, in both cases, on a distance window of the same width, but carries out the frequency analysis by fast Fourier transformation (FFT) based on a variable number of samples relating to the same distance window, the respective numbers of samples associated with the two pulse repetition frequencies being, themselves, in the ratio of the said two adjacent prime integers, this defining a resolution cell which is invariant with regard to the pulse repetition frequency. The extraction device comprises (i) means for summing the quantity of energy in each distance/velocity cell, over all the relative pulse repetitions at, on the one hand, one of the pulse repetition frequencies and at, on the other hand, the other pulse repetition frequency, as well as (ii) processing means capable of (a) constructing the possible pairs, having regard to the ambiguity, between a distance/velocity cell associated with one pulse repetition frequency, and different distance/velocity cells associated with the other pulse repetition frequency, (b) comparing the sum of the energies received in the two cells of an individual pair with a threshold value, and (c) when the threshold is exceeded, admitting a true echo for the unambiguous or less ambiguous distance and velocity corresponding to the said pair.

The present invention likewise provides a process for the determination of movable targets by means of a radar with emission of recurrent pulses and with coherent reception, in which:

A. the complex signal resulting from the coherent reception is temporarily recorded, B. a time and frequency analysis of this complex signal is undertaken, by determining the energy received in different distance/velocity resolution cells, which subdivide each pulse repetition, and C. true radar echoes are determined, by comparison of a mean of these quantities of energy with a threshold.

According to the invention, the operations A and B are carried out successively, with an invariant resolution cell, for two different pulse repetition frequencies, of a value such that the signal received exhibits an ambiguity both with regard to distance and with regard to velocity, and the operation C comprises the following steps:

C1. forming the mean of the quantity of energy, in each distance/velocity cell, over all the pulse repetitions, but separately for the one and the other of the two pulse repetition frequencies, C2. constructing the possible pairs, having regard to the ambiguity, between a distance/velocity cell associated with one pulse repetition frequency and different distance/velocity cells associated with the other pulse repetition frequency, C3. forming the mean of the quantities of energy which relate to the two cells of an individual pair, C4. comparing this mean with a threshold value, and C5. when the threshold is exceeded, admitting a true echo for the unambiguous or less ambiguous distance and velocity, corresponding to the said pair.

BRIEF DESCRIPTION OF THE DRAWINGS

Further characteristics and advantages of the invention will appear on examining the following detailed description, as well as the accompanying drawings in which:

FIG. 2 is the electrical diagram, partly detailed, range finder 11 of FIG. 1;

FIGS. 3 and 4 are two diagrams permitting a better understanding of the elimination of ambiguity according to the present invention.

DESCRIPTION OF THE PREFERRED EMBODIMENT

In the detailed description hereinafter, it will be assumed that the radar pulses are emitted in the form of pure microwave energy. The invention will certainly also be applicable for other forms of the emission pulse, which possess the same ambiguity properties.

Figure 1:
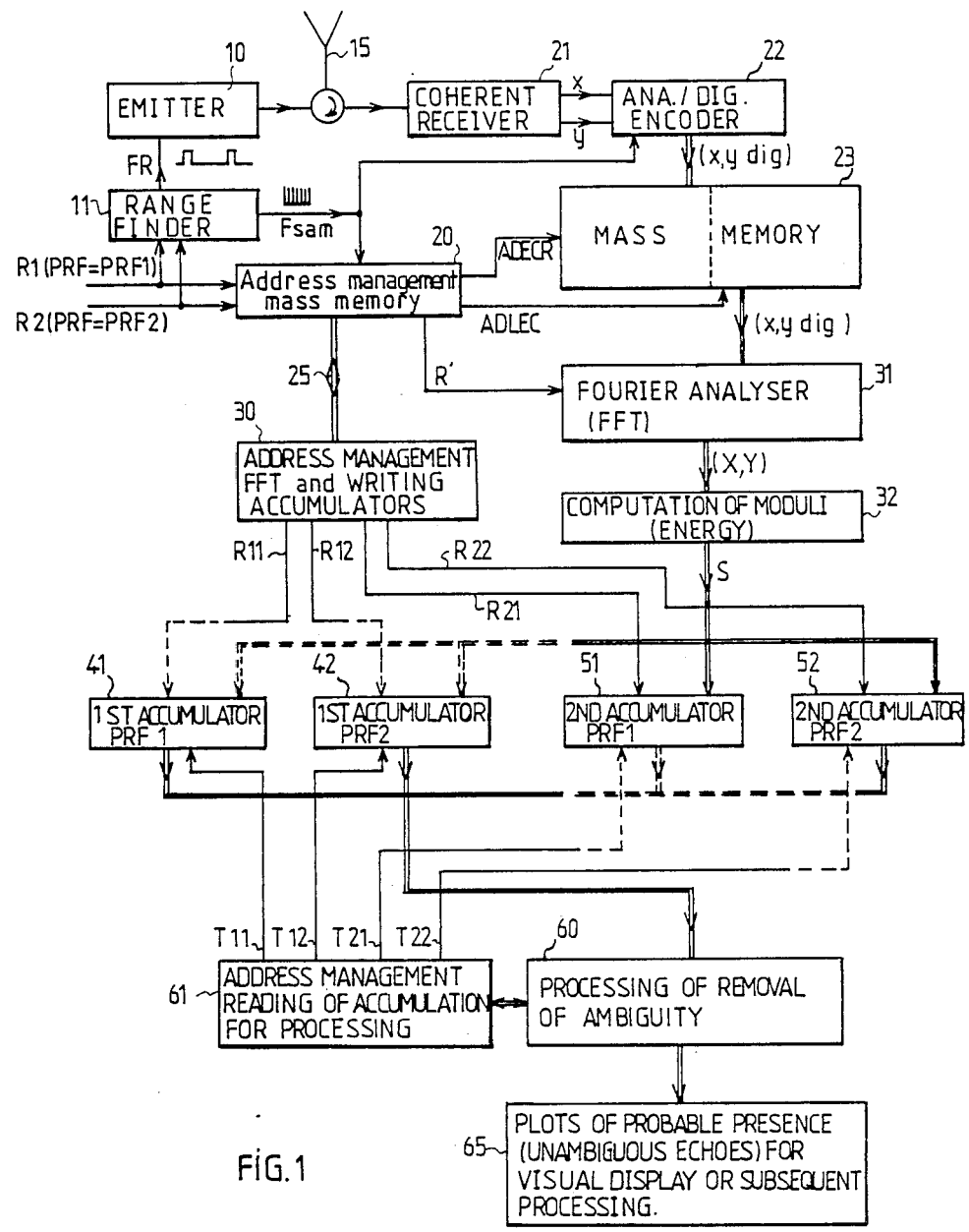
FIG. 1 is the basic diagram of a radar apparatus implementing the present invention.

In FIG. 1, the reference 10 designates the emitter circuit of the radar. The latter produces pulses of microwave energy of, for example, wavelength 3 cm. (All the following numerical values are given by way of example). The pulses follow one another at instants and at a frequency which are defined by a signal FR. They are applied to an antenna 15 via a circulator 12, the reception output of which is connected to a coherent receiver 21. The receiver delivers a complex analogue signal with two components x and y (in quadrature).

A circuit 11, called a range finder in the radar art, generates the pulse repetition frequency PRF, as well as a sampling frequency Fsam, which is a multiple of the pulse repetition frequency. The detailed diagram of FIG. 2 illustrates how these signals can be generated. A base oscillator 110 supplies a frequency of 120 MHz to a first divider 111, which divides this frequency by an integer chosen as $N=55$ to deliver the sampling frequency Fsam. Two other dividers 112 and 113 again divide Fsam by $M_1=32$ and $M_2=36$, giving frequencies PRF1 and PRF2 respectively. Under the control of two pulse repetition mode command signals designated R1 and R2, switches 118 and 119 permit PRF1 or PRF2 to be supplied as pulse repetition frequency for the emitter 10. It will be noted that the ratio PRF1/PRF2 has a value of 36/32, i.e. 9/8. Thus, the quotient of the two pulse repetition frequencies is reducible to the ratio of two integers $P_1=9$ and $P_2=8$ which are among themselves prime. As an MPRF radar is involved, the values of two pulse repetition frequencies are such that the received signal exhibits an ambiguity both with regard to distance and with regard to velocity. The corresponding numerical values may be dependent upon the type of radar concerned. In practice, the pulse repetition frequencies are included within the range which extends from 5 to 100 kHz, preferably from 8 to 80 kHz.

Th signals R1 and R2 are generated in such a manner that the two pulse repetition modes which they define comprise an integral number of pulse repetitions. Advantageously, the two modes have the same duration; in fact, if $K_1$ designates the number of pulse repetitions of the mode R1 (frequency PRF1) and if $K_2$ designates the number of pulse repetitions of the mode R2 (frequency PRF2), the numbers $K_1$ and $K_2$ are, in relation to each other, in the ratio $P_1/P_2$, or 9/8 in the example quoted. Preferably, the integers $P_1$ and $P_2$ are less than 20, and advantageously they differ by one unit.

Reference will now be made, once again, to FIG. 1. The output (x, y) of the coherent receiver 21 is applied to an analogue-digital encoder 22, which operates with a sampling rate defined by the signal Fsam. The encoder 22 operates virtually in real time. For each analogue sample (x, y), it supplies a corresponding digital sample (x, y, DIG) constituted by, for example, two times 10 bits. Depending upon whether the pulse repetition frequency is PRF1 or PRF2, the encoder 22 takes $M_1=32$ or $M_2=36$ samples in each pulse repetition, thus defining implicitly as many distance windows subdividing each pulse repetition precisely. The digital samples successively delivered by this encoder are applied to a mass memory 23, which forms a buffer.

The mass memory 23 is preferably divided into two parts, one of which is in the course of filling by the analogue-digital encoder, while the other, previously filled, is in the course of processing by a device 31 situated downstream. The addressing within the memory 23 is carried out by an address management circuit 20 which receives the signals R1 and R2 defining the current pulse repetition mode, as well as the sampling frequency Fsam. It supplies to the mass memory 23 a write address signal WRAD and a read address signal READ. The write and read addressing is indeed periodically reversed between the two parts of the mass memory, after each complete filling thereof.

At each pulse repetition of frequency RF1, the encoder 22 will produce 32 samples, which are entered in a corresponding mine of the mass memory until $N_1=144$ lines of the memory have been filled in this manner.

For the pulse repetition frequency PRF2, the encoder 22 will supply 36 samples per line, until $N_2=128$ lines of the mass memory have been filled. The principal function of the address management circuit 20 is therefore to adapt the addressing within the mass memory, according to the pulse repetition frequency concerned. It will be noted that $N_1/N_2=P_1/P_2$, with $M_1 \times N_1 = M_2 \times N_2$.

When the appropriate number of lines and of columns has been filled within the mass memory (which is asssumed to be the case for its right-hand part) this digital information is utilized for the time and frequency analysis by the device 31.

The read addressing is carried out column by column, since each column corresponds to the same distance window in several consecutive repetitions carried out at the same frequency. The time analysis is therefore reduced, in fact, to this addressing, in combination with the sampling by the encoder 22.

Depending upon the value of the pulse repetition frequency concerned (that which existed at the reception of the signal represented by the digital samples concerned), this being a value which is defined by a signal R' generated by the address management circuit 20, the device 31 will carry out a frequency analysis by fast Fourier transformation on $N_1$ digital samples (for PRF1), or on $N_2$ digital samples (for PRF2). Accordingly, the procedure commences by the first column of the memory, or first distance window, of each pulse repetition, which forms the subject of a frequency analysis of $N_1$ or $N_2$ Doppler filters, depending upon whether the pulse repetition frequency PRF1 or PRF2 is concerned. The process is indeed repeated for the $M_1$ or $M_2$ columns which are entirely filled within the mass memory. After having completely utilized the pertinent part of the memory 23, the FFT analyser 31 will thus have processed $M_1 \times N_1$ distance/velocity resolution cells, in the case of the frequency PRF1, or alternatively $M_2 \times N_2$ cells, in the case of PRF2, the two products being equal.

For each resolution cell, the output of the FFT analyser 31 is a complex digital signal of the form (X,Y). This signal is then applied to a circuit 32 which effects a computation of modulus S of the form $\sqrt{X^2+Y^2}$. The output S of the computing device 32 is a quantity representing the energy received in each resolution cell. This signal S is applied as digital input to four accumulator memories, known more briefly as accumulators, designated 41, 42, 51 and 52. One only of the accumulators will take into account each signal S under the control of another address management circuit designated 30, which supplies write address signals R11, R12, R21, R22 respectively to the accumulators 41, 42, 51, and 52. By a link 25 with the first address management circuit 20, the circuit 30 knows to what value of the pulse repetition frequency and to what distance/velocity resolution cell the signal S which is currently present at the output of the device 32 corresponds.

The outputs of the set of accumulators are applied to the ambiguity removal processing device 60. A third address management device 61 defines read addresses on respective lines T11, T12, T21, T22, proceeding towards the accumulators 41, 42, 51, 52 respectively.

The two address management circuits 30 and 61 divide the accumulators into two pairs, 41, 42 on the one hand, and 51, 52 on the other hand. Within each pair, one 41, 51 of the accumulators is dedicated to the pulse repetition frequency PRF1; the other 42, 52 is dedicated to the pulse repetition frequency PRF2. While one of the pairs, for example 51, 52, is in the process of accumulating quantities of energy S which are supplied by the device 32, the other, i.e. 41, 42, is allocated to the ambiguity removal processing on the basis of previously accumulated information. The operation of the accumulators is described hereinafter in this situation which is symbolized on the drawing by a representation, in solid lines, of the lines of signals and of active addresses, and a representation, in partially broken lines, of lines of signals and of addresses which are not currently in the course of operation.

Attention will therefore now be given, once again, to the writing, which is in progress in the pair of accumulators 51, 52. The device 32 will deliver, first of all, $M_1 \times N_1$ moduli $S_{ij}$, concerning the pulse repetition frequency PRF1. These moduli are arranged in the accumulator 51 at respective addresses each corresponding to a particular value of the indices i and j, under the control of the line of addresses R21. This lasts throughout the mode R1, accumulating at the same address all the moduli relating to the same distance/velocity resolution cell.

Then, during the mode R2, the device 32 will supply $S1_m$ moduli relating to the $M_2 \times N_2$ resolution cell of the pulse repetition frequency PRF2. In their turn, these moduli are accumulated, per resolution cell, within the accumulator 52, under the control of the line of address R22. It will be noted that the accumulators all have the same storage capacity.

A person skilled in the art will appreciate that, by performing, for each resolution cell of each pulse repetition mode, a summation or accumulation of the various moduli obtained over the entire mode, a mean or integration of the useful signal over a long interval of time is carried out. This imparts an excellent sensitivity to the radar. The integration time depends upon the integers $K_1$ and $K_2$ which have already been mentioned. By way of example, it will be assumed that $K_1=3\times N_1=432$ and $K_2=3\times N_2=384$.

A description will now be given of the processing for the removal of ambiguity, with regard to distance and also with regard to velocity. This processing is undertaken on the basis of the moduli contained within the accumulators 41, and 42, which are assumed to be entirely filled.

Consider now, for the first pulse repetition frequency PRF1, the resolution cell defined by the distance window No.i and the Doppler filter No.j. Designating by D the unambiguous distance, and by δD the width of the distance window, D is given by the following relation :

$$D=(i+r.M_1)\delta D. \tag{I}$$

In this relation, r is an unknown integer which can take the value 0, 1, ... etc., and can define the degree of distance ambiguity of the information contained within the distance/velocity cell concerned.

A relation of the same type can be obtained for the unambiguous Doppler shift designated Fd, by designating as ΔF the width of the Doppler window obtained from each filter (or step width of the filters). This relation is written as follows:

$$Fd=(j+v.N_1)\Delta F, \tag{II}$$

where j designates the number of the Doppler filter concerned, and v is an unknown integer, which can take the values 0, 1, ... etc., and defining the degree of velocity ambiguity.

Similar relations can be written for the second pulse repetition frequency PRF2, by replacing i by l, j by m, $M_1$ by $M_2$ and $N_1$ by $N_2$.

The diagrammatic illustration given in FIGS. 3 and 4 permits a better understanding of the phenomenon of ambiguity. In order to simplify the drawing, these Figures are limited to the degrees of ambiguity 0 and 1, with $M_1=N_2=8$ and $M_2=N_1=9$.

It is assumed that a signal of high energy has been received within the resolution cell $i=j=5$ for the pulse repetition frequency PRF1. FIG. 3 shows that this signal may correspond to one of the four frames marked by hatchings or by a circle.

FIG. 4, relates to the pulse repetition frequency PRF2, and shows how it can be used to remove the ambiguity. If, for PRF2, $i=m=5$ is obtained, it is then the frame with hatchings rising from the left towards the right which corresponds to the true echo. If $l=4$ and $m=5$ is obtained, it is the frame with hatchings descending from the left towards the right which corresponds to the true echo. If $l=5$ and $m=6$ is obtained, it is the frame marked by a circle which corresponds to the true echo. If $l=4$ and $m=6$ is obtained, it is the double hatched frame which marks the true echo.

Figure 5:
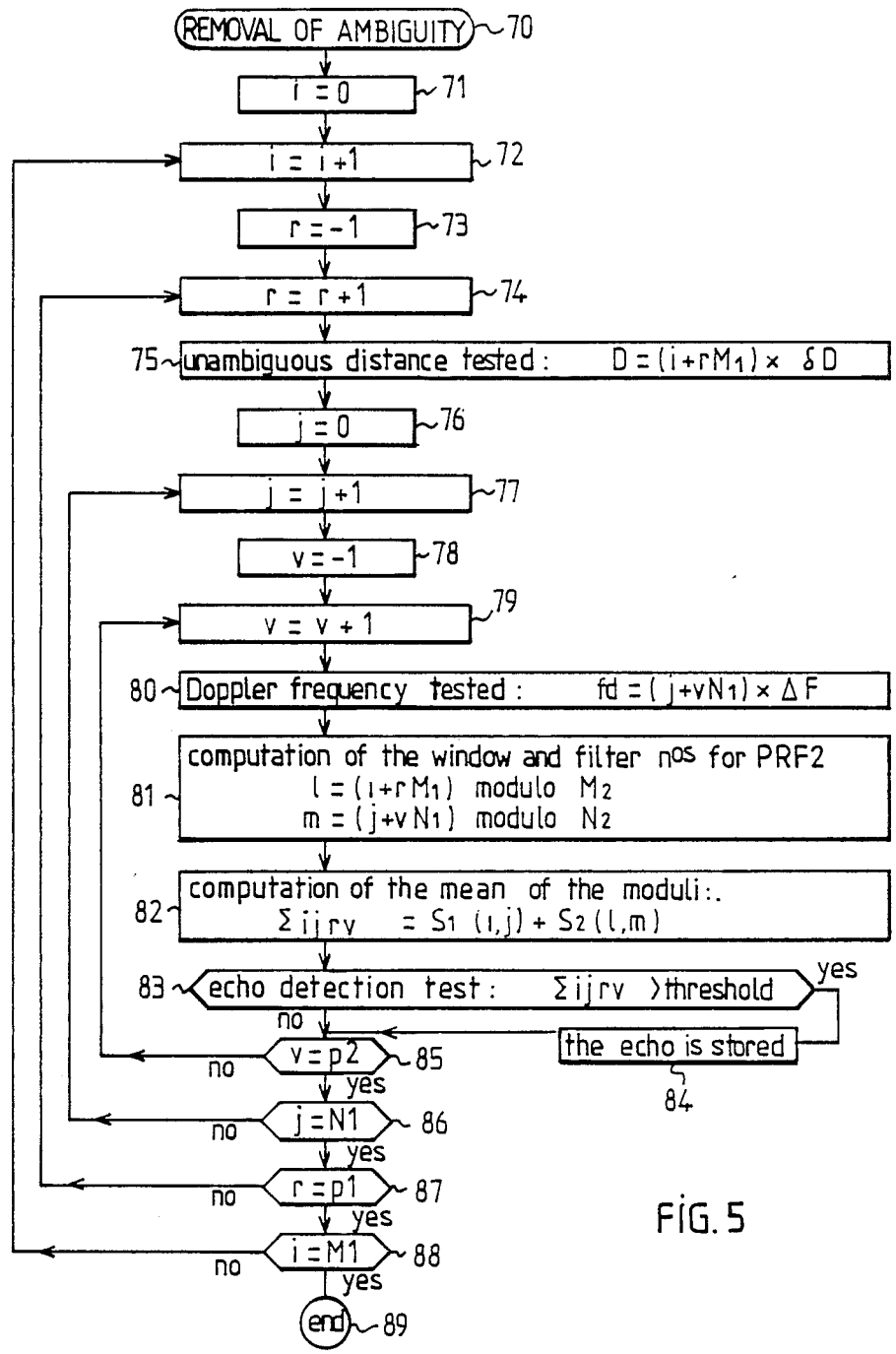
FIG. 5 is an organigram which diagrammatically represents the processing of the signals for the removal of the ambiguity.

This process is performed, in a manner which is more extensive with regard to the degrees or ranks of ambiguity, by the processing device 60. To this end, the device 60 comprises a processing unit suitable for carrying out the sequence of operations defined by the organigram of FIG. 5.

When a pair of accumulators has been completely filled, the organigram starts, proceeding from the step 70. The step 71 consists in resetting to the value 0 the index i of the distance windows for the frequency PRF1. The step 72 then performs the incrementation $i+1$, which gives the initial value $i=1$ relating to the first distance window. The steps 73 and 74 proceed in a similar manner with the distance ambiguity rank r, which is initially fixed at 0. The step 75 then concludes the value of the unambiguous distance tested, corresponding to the relation (I) given above.

Attention is then given to the velocity. The steps 76 and 77 initialize j for the Doppler filter No. 1. The steps 78 and 79 initialize the degree of ambiguity of velocity v at the value 0.

The step 80 then tests the unambiguous Doppler frequency corresponding to the relation (II) given above.

After that, the step 81 determines, by computation, the window numbers and filter numbers relating to the frequency PRF2, which are liable to correspond to the windows and filters i and j of the frequency PRF1, for the degreee of ambiguity adopted. This computation is designed by the relations:

$l=(i+r.M_1)$ modulo $M_2$, and $m=(j+v.N_1)$ modulo $N_2$.

For each resolution cell i, j and each value of the degrees of ambiguity r, v, a resolution cell will be found at the frequency PRF2, defined by l and m.

The step 82 then computes the mean of the moduli (or quantities of energy) stored respectively in the accumulators 41 and 42 for the cells i, j and l, m. This may be written by the relation indicated within the frame 82 of FIG. 5. In certain applications, it may be advantageous to determine also within the step 82 whether the coupled moduli Sij and Skl are of comparable amplitudes. If this condition is not fulfilled, it is possible to jump directly to step 85.

Under normal conditions, the step 83 is a test which will compare the quantity $\epsilon_{i,j,r,v}$ with a threshold. If the threshold is exceeded, the step 84 stores an echo, for the unambiguous distance defined in the step 75, and the unambiguous frequency defined in the step 80, a velocity corresponding to this frequency. More precisely, this step 84 defines a plot of the probable presence of a movable target characterized by this distance and this velocity which are unambiguous.

Whether or not there is storage of an echo, the procedure then passes to the step 85. The latter tests whether the degree of ambiguity of velocity v has reached its maximum value $P_2$. If not, looping takes place to the step 79, which increments v. If so, the procedure passes to the step 86, which tests whether the index j of the Doppler filters has reacned its maximum value $N_1$. If not, looping to the incrementation step 77 takes place. If so, the procedure passes to the step 87, which tests, n its turn, whether the degree of ambiguity r for the distance has reached its maximum value $P_1$. If not, looping takes place to the incrementation step 74. If so, the procedure passes to the step 88, which tests, finally, whether the index i has reached its maximum value $M_1$. If not, looping takes place to the incrementation step 72. If so, the procedure passes to the final step 89, which indicates that the removal of ambiguity is completed for the set of information contained within the pair of accumulators which is involved (in this case 41 and 42).

It will be understood that the indices i and j correspond to an address within the accumulator PRF1 (41 in the case under consideration; 51 in the other case). Likewise, the indices l and m correspond to an address within the accumulator PRF2 (42 in the case under consideration; 52 in the other case). The transfer from the indices to the address values is undertaken in the address management circuit 61, which can, moreover, be incorporated in the processing unit 60.

On conclusion of each removal of ambiguity, the result is thus one or more plots of probable presence, or unambiguous echoes, which are transmitted to the block 65 of FIG. 1, which block schematizes the fact that these echoes are going to be visually displayed, or otherwise revealed to the user, directly or after a subsequent processing.

The refinement of the velocity and distance coordinates is undertaken by computation of centre of gravity on the basis of the information framing each extreme position of the velocity-distance-modulus surface.

The possible subsequent processing of the plots of probable presence which are obtained according to the invention may involve utilization of all other information acquired in relation to the target. In particular, it is possible to utilize more than two pulse repetition frequencies. The additional pulse repetition frequency or frequencies may be utilized in a traditional manner, that is to say without modifying again the arrangement of the device for FFT frequency analysis, to adapt its number of samples taken to the value of the pulse repetition frequency, and to obtain an invariant resolution cell.

However, it is likewise possible to envisage that a third pulse repetition frequency will be used, this too having the characteristic features of the present invention. An indication has been given, above, of the preferred values 9 and 8 for the integers $P_1$ and $P_2$ associated with the first two pulse repetition frequencies. It is advantageous that these integers should be multiples of 2 and of 3. In the case where use is made of a third pulse repetition frequency according to the present invention, the integer $P_3$ which will be associated with it will preferably be equal to 5, or to an integral multiple of 5.

We claim:

1. In a radar apparatus, having:
   (a) emitter means for emission of recurrent pulses;
   (b) coherent reception means;
   (c) store means for temporary recording in store of digital samples representing the complex signal resulting from the coherent reception means;
   (d) time and frequency analysis means for analysing said complex signal based on said digital samples to determine an energy quantity representing the energy received in each of several distance/velocity resolution cells; and
   (e) extraction means for extracting true echoes, on each occasion by comparison of one of said energy quantities with a threshold,
   the improvement wherein
   (i) in each beam position the emitter means of the radar is activated successively according to first and second different pulse repetition frequencies of values such that the received signal is ambiguous both with regard to distance and with regard to velocity, their ratio being reducible to the quotient of first and second integers which have no common factors;
   (ii) the time and frequency analysis means operates in both pulse repetition frequencies over the same width of distance window, but effects the frequency analysis by fast Fourier transformation from a variable number of samples relating to the same distance window, the numbers of samples associated with the two pulse repetition frequencies being, in relation to each other, in the ratio of said two integers thus defining a resolution cell which is invariant with regard to the pulse repetition frequency; and
   (iii) said extraction means comprises: summing means for summation of the said energy quantity within each distance/velocity cell, over all the pulse repetitions relating, on the one hand, to the first pulse repetition frequency and, on the other hand, to said second pulse repetition frequency, as well as processing means capable of constructing the possible pairs, having regard to the ambiguity, of a frst distance/velocity cell associated with said first pulse repetition frequency and a further differing distance/velocity cell associated with the second pulse repetition frequency, of comparing the sum of the energy quantity received within the two cells of an individual said pair with a threshold value, and on exceeding said threshold, of acknowledging a true echo for the less ambiguous distance and velocity corresponding to the said pair of cells.

2. A radar apparatus according to claim 1, wherein said coherent reception means receives an analogue signal and includes analogue-to-digital converter means for converting said analogue signal into said complex signal at a sampling frequency, and wherein said first and second pulse repetition frequencies are obtained by division of said sampling frequency used for the analogue-digital conversion of the signal emanating from the coherent reception means.

3. A radar apparatus according to claim 1, wherein said summing means for summation of the energy quantities are distributed in first and second groups, said first group being operative to effect the summation, while the second group operates with said processing means.

4. A radar apparatus according to claim 1, wherein said first and second integers are less than 20, said first integer is a multiple of 2, and said second integer is a multiple of 3.

5. A radar apparatus according to claim 4, wherein said first and second integers are 8 and 9, respectively.

6. A radar apparatus according to claim 1: wherein said first and second pulse repetition frequencies are within the range from 5 to 100 kHz.

7. A radar apparatus according to claim 6, wherein said range is from 8 to 80 kHz.

8. A radar apparatus according to claim 1, wherein said store means comprises a mass memory, arranged in two parts which operate alternately for the writing of digital samples and the reading thereof at the destination of the time and frequency analysis means; and wherein the portion of said mass memory used for the recording is adjusted according to the value of that one of said first and second pulse repetition frequencies concerned.

9. A radar apparatus according to claim 1, wherein said acknowledged true echo is for the unambiguous distance and velocity corresponding to said pair of cells.

10. A radar apparatus according to claim 1, wherein said first and second integers are consecutive.

11. In a process for the determination of movable targets by means of a radar using emission of recurring pulses and with coherent reception, comprising the steps of:
   (a) temporarily recording the complex signal resulting from the coherent reception;
   (b) time and frequency analysis of this complex signal by determining the energy received in different distance/velocity resolution cells, which subdivide each pulse repetition; and
   (c) determining true radar echoes by comparison of a mean of these energy quantities with a threshold: the improvement wherein
   (d) the operations (a) and (b) are executed successively, with an invariant resolution cell, for first and second different pulse repetition frequencies, of values such that the received signal exhibits an ambiguity both with regard to distance and with regard to velocity;
   (e) the operation (c) comprises the following steps:
      (c1) forming the mean of the energy quantity, in each distance/velocity cell, over all the pulse repetitions but separately for said first and said second pulse repetition frequency,
      (c2) constructing the possible pairs, having regard to the ambiguity, of a first distance/velocity cell associated with said first pulse repetition frequency and a further different distance/velocity cell associated with said second pulse repetition frequency,
      (c3) forming the mean of the energy quantities which relate to the two cells of an individual said pair,
      (c4) comparing said mean with a threshold value, and
      (c5) when said threshold value is exceeded, admitting a true echo for the less ambiguous distance and velocity corresponding to said pair of cells.

12. A process according to claim 10, wherein said admitted true echo is for the unambiguous distance and velocity corresponding to said pair of cells.

13. A process according to claim 11, wherein the operation (c2) consists of:

exploring on a plurality of occasions all the distance/velocity cells of the first pulse repetition frequency mode and associating with them on each occasion an increasing degree of ambiguity in distance and in velocity, for each said distance/velocity cell and on each said exploration, searching for the corresponding said further distance/velocity cells of the second pulse repetition frequency mode, having regard to the difference of ambiguity between the two modes; and wherein the operations (c2) through (c5) are repeated for each pair of cells until the degrees of ambiguity reach the values of two integers which have no common factors.

14. A process according to claim 13, wherein the execution of the operations (c3) through (c5) is, on each occasion, subject to the condition that the two energy quantities concerned are of comparable values.

15. A process according to claim 13, wherein said two integers are consecutive.

* * * * *